United States Patent [19]

Behn

[11] Patent Number: 4,639,832
[45] Date of Patent: Jan. 27, 1987

[54] CONSOLIDATED WINDING ELECTRICAL CAPACITOR AND METHOD FOR THE MANUFACTURE THEREOF

[75] Inventor: Reinhard Behn, Munich, Fed. Rep. of Germany

[73] Assignee: Siemens Aktiengesellschaft, Berlin and Munich, Fed. Rep. of Germany

[21] Appl. No.: 862,822

[22] Filed: May 13, 1986

[30] Foreign Application Priority Data

May 14, 1985 [DE] Fed. Rep. of Germany ....... 3517435

[51] Int. Cl.⁴ ...................... H02B 1/04; H01G 13/06; H01G 4/08
[52] U.S. Cl. .................................. 361/306; 29/25.42; 361/323
[58] Field of Search ............... 29/25.42; 361/306, 308, 361/309, 310, 323

[56] References Cited

U.S. PATENT DOCUMENTS

| | | | |
|---|---|---|---|
| 3,590,347 | 6/1971 | Gottlob et al. | 317/258 |
| 3,614,561 | 10/1971 | Behn et al. | 317/258 |
| 3,651,548 | 3/1972 | Behn | 29/25.42 |
| 4,041,587 | 8/1977 | Kraus | 29/25.42 |

FOREIGN PATENT DOCUMENTS

| | | |
|---|---|---|
| 1439622 | 9/1969 | Fed. Rep. of Germany . |
| 2416566 | 5/1976 | Fed. Rep. of Germany . |
| 874940 | 8/1961 | United Kingdom . |
| 1149838 | 4/1969 | United Kingdom . |

Primary Examiner—Donald A. Griffin
Attorney, Agent, or Firm—Hill, Van Santen, Steadman & Simpson

[57] ABSTRACT

At an end face, an electrical capacitor formed of a consolidated winding of dielectric bands wound with one another, has a circular, oval, or flat cross section. Each is provided with a regenerably thin metal layer as a coating. An incision is employed to create two projections. The coatings alternate from wound layer to wound layer, and extend in these projections up to the ends of the projections, separated by metal-free insulating strips. Thus, antipolar coatings are electrically connected to one another there. The metallized plastic bands are provided with correspondingly arranged metal-free strips which are wound. The windings which result are provided with the incisions.

21 Claims, 8 Drawing Figures

CONSOLIDATED WINDING ELECTRICAL CAPACITOR AND METHOD FOR THE MANUFACTURE THEREOF

BACKGROUND OF THE INVENTION

The invention relates to a consolidated winding electrical capacitor having a circular, oval, or flat cross-section of dielectric bands of stretched plastic films or sheets wound with one another and each provided with a regenerably thin metal layer as a coating. The coatings, alternating from band to band, extend to different edges and form surfaces at which the antipolar coatings are connected to one another by schoopageapplied metal layers serving the purpose of contacting, and to which power leads are secured.

The invention further relates to a method for the manufacture of such an electrical capacitor wherein bands of stretched plastic films or sheets are metallized on one side at least up to one edge. The bands act as a dielectric and, in particular, have a wavy cut at the edge, and are wound onto a winding spindle having a circular, oval, or flat cross section. The winding thus fashioned is then freed from the winding spindle under given conditions and the wound capacitor which has thus arisen is provided with end contact layers.

Electrical wound capacitors of this type and methods for their manufacture comprising the above-specified method steps have been known for many decades. They have been employed as stretched plastic films, films of polycarbonates, polyethylene terephthalate, or propylene. The application of the metal layers to the two end faces which serves the purpose of contacting the individual coatings occurs by means of the widely known schoopage method.

German OS No. 33 42 329, corresponding to U.S. Pat. No. 4,563,724 incorporated herein by reference, describes an electrical capacitor of a consolidated stack of dielectric layers of plastic films layered on top of one another. Each is provided with a metal layer as a coating. It has an incision at one narrow side. As a consequence, the individual dielectric layers are provided with projections on which, alternating from layer to layer, the coatings are interrupted by insulating strips. Thus, the metallizations situated on the surfaces formed by the projections connect antipolar coatings to one another in alternating fashion. The method set forth in U.S. Pat. No. 4,563,724 provides that metallized plastic bands with correspondingly arranged, intermittent metal-free strips are provided which are subsequently wound onto a drum. Thus, the incisions are produced in the resulting mother capacitors, and the individual stacks are subsequently parted from the mother capacitors.

The electrical layer or stacked capacitor of U.S. Pat. No. 4,563,724 has an extremely low induction because the current paths over the metal coatings, through the dielectric and onto the antipolar coatings, proceed in opposite directions so that these current paths are compensated, and thus cannot produce a magnetic field (induction).

Previously known low-induction wound capacitors have their dielectric formed, in particular, of stretched polystyrol, and coatings which are in the form of self-bearing metal foils which are wound with the polystyrol films. In order to achieve low inductance, the external power feed elements are connected to the metal foils such that the current paths in the metal foils mutually compensate. For example, the power feed to one metal foil is connected as close as possible to or in the center of the winding, and the other power feed is connected to the other metal foil at the periphery of the winding (bifilar format).

Low-induction electrical wound capacitors having dielectric bands on which a regenerably thin metallization is applied are either unknown or have not enjoyed application in practice.

SUMMARY OF THE INVENTION

An object of the present invention is to specify an electrical capacitor of the type initially cited which is of low-induction, which further enables as small as possible a grid dimension between the power lead elements, for example 2.5 mm, and whose manufacture is nonetheless simple, even as a mass-produced article. The invention is further based on the object of specifying a method for the manufacture of such capacitors.

In order to achieve this object, the electrical capacitors of the invention have the following features:

(a) alternating from band to band, the coatings extend up to the ends of two projections which have arisen by means of an incision in an end face, this incision in the direction of the longitudinal axis of the winding being roughly in the center of the end faces;

(b) the surfaces formed by the ends of the projections in the consolidated winding are provided with the metal layers serving the purpose of contacting;

(c) alternating from dielectric band to dielectric band, the projections are provided with metal-free insulating strips, whereby the depth of the incision is either greater than the width of the remaining metal strip formed by the insulating strips, coincides with the inside edges of the insulating strips, or preferably extends beyond these edges into the winding. The plastic films forming the dielectric bands are preferably 1 to 15 μm thick. The material of which these plastic films are formed is polycarbonate, polypropylene, and preferably polyethylene terephthalate.

In discussing the prior art, U.S. Pat. No. 4,563,724, already discussed in the introduction, specifies a plurality of methods by means of which the cut edges of the incision in the present instance guarantee an adequate insulation. In accordance with the method disclosed in U.S. Pat. No. 3,614,561, incorporated herein by reference, and employed here by way of example, stretched plastic films of the materials provided with a regenerably thin coating of valve metal, for example aluminum or zinc, are employed therein. A partial de-stretching of the plastic film in the edge region occurs due to a sawing operation, and the continuity of the valve metal is disturbed there due to this de-stretching. The metal is oxidized under the influence of air under given conditions and shrinks to form islands. The insulating path is thus lengthened beyond the thickness of the plastic film onto the surface thereof, so that, especially given the usually applied curing of voids by means of elevated voltage, the edge insulation is significantly increased and the practical use of the capacitors is then even possible given relatively high voltages (for example, 350 V).

Such prior art techniques which increase the edge insulation in the region of the cut edge are also utilized in the manufacture of the capacitor of the present invention (in addition to U.S. Pat. No. 3,614,561, also see U.S.

Pat. Nos. 3,590,347 and 4,041,587, all incorporated herein by reference).

It is also advantageous when the dielectric bands comprise metal-free strips in the region of the upper end face of the winding.

These metal-free strips assure that an adequate insulation between the coatings is also present in the region of the end face lying opposite the incision. In case the metal layers serving as coatings extend up to the end face, the edge insulation can be improved by the methods set forth.

The wavy cut at the edge side serves the purpose here, as also set forth for example in German Pat. No. 24 16 566, incorporated herein by reference, of increasing the mechanical stability and the electrical connection between the coatings and the metal layers applied to the surfaces of the projections. Thus, the number of waves is lower than the length of the edges to be contacted, and the frequency of the ripple of neighboring film layers can also be different.

Power lead wires extending in the direction of the longitudinal axis of the winding are secured to the metal layers which serve for contacting the antipolar coatings. For integration of the capacitor in chip format, power leads of solderable material can be secured to the metal layers, these power leads also being fashioned in cap-like fashion under given conditions, and then embracing the feet formed by the projections of the winding.

A further advantage is that the capacitance of the wound capacitor can be matched to a desired, narrow tolerance value by means of the width and/or depth of the incision.

In accordance with a development of the invention, the electrical capacitor contains blank windings and windings as cover layers on which the metallization of the bands are not electrically connected to the metal layers on the projections. This results because there is at least one metal-free transversely proceeding insulating strip and because there are through metal-free insulating strips in the winding direction.

The method of the invention can be performed with the following steps.

(a) Metallized bands are wound onto the winding spindle; these bands comprise what may be through metal-free strips at one respective edge; metal-free insulating strips intermittent in a winding direction are generated before or during winding in the regions of the opposite edges and at distances therefrom such that when wound onto the drum, the insulating strips lie in a plane perpendicular to the winding axis; and both the ends as well as the beginnings of the insulating strips extend into the region of the later incision, or go slightly beyond this region.

(b) When being wound onto the winding spindle, the bands are guided and the insulating strips generated before or during winding are dimensioned with respect to their length such that the centers of the insulating strips of the upper band reside symmetrically opposite the centers of the insulating strips of the lower band in the winding.

(c) After the winding has been finished, a metal layer, serving the purpose of contacting, is applied to the end face adjacent to the insulating strips, and an incision is then produced in the end face perpendicular to the connecting line between the centers of the insulating strips and in the direction of the longitudinal axis of the winding, the two projections arising as a result of the width and depth of this incision.

(d) The wound capacitor is completed by applying an elevated voltage for curing voids in the inside of the winding and at the edges of cut edges, as well as by fastening power leads to the metal layers of the projections.

In one embodiment of this method, the bands to be wound onto the winding spindle in method step (a) are respectively provided with the intermittent metal-free insulating strips at both edges, so that a winding for two capacitors arises, this being divided into these two capacitors along a cut line after the winding operation has been ended.

With this embodiment, it is advantageous when the metallized bands to be wound are provided with metal-free strips in the middle which pass through.

The production of the incision preferably occurs by means of a saw, so that the required, lengthened insulating distances at the edges of the cut edge arise in this sawing operation. Voids that may still be present in the inside of the winding and, in particular, at the cut edges, are cured in a fashion known per se by applying a voltage that is higher than the nominal voltage at which the capacitor is to be later operated.

When two wound capacitors are simultaneously manufactured from one band in one winding operation, then the insulation at the end face opposite the incision is either guaranteed by an insulating strip already present on at least one of the bands, or the required insulating distances extending beyond the edges onto the surfaces are likewise effected by the sawing operation in a known way.

The manufacture of the intermittently metal-free insulating strips on the bands is preferably undertaken by the application of laser beams or by employing ablation wheels. The laser pulses or the ablation clocks of the ablation wheels are controlled so as to be synchronized with the rotation of the winding spindle. Thus, the desired position and length of the insulating strips relative to one another and also relative to their arrangement in the winding can be achieved, given an increasing radius.

Dielectrically ineffective blank windings in the inside of the winding and windings as cover layers, for example, for protection against mechanical stresses or for shielding noise voltages, can be generated. A few blank windings of the metallized tapes are first wound onto the winding spindle. These are provided with through metal-free strips in the region of the intermittent metal-free insulating strips. A metal-free strip proceeding transversely across at least one band is then produced, and the manufacture of the intermittent insulating strips subsequently occurs in the same winding operation. For producing windings serving as cover layers around the wound capacitor, a metal-free insulating strip proceeds transversely over at least one band. It is first produced in the same way subsequent to the intermittent metal-free insulating strips. Through metal-free insulating strips are subsequently produced in the same winding operation in the region of the intermittent insulating strips. As a consequence of the transversely proceeding insulating strips which run in a winding direction, the metal layers on the dielectric bands in the region of the blank windings and of the cover layers are no longer electrically connected to the remaining metal strips in the finished capacitor.

In contrast to the known prior art, an arbitrary number of blank windings and windings as cover layers can be produced by means of this method.

A preferably applied method for producing the intermittent and, in particular, the through metal-free insulating strips is disclosed in full detail in German OS No. 35 14 842, incorporated herein by reference.

First and foremost, the advantages achieved by the invention are that these wound capacitors are largely low-induction. Over and above this, grid dimension spacings of 2.5 mm between the power lead wires can be achieved without these power lead wires having to be set to such a grid dimension by means of corresponding bending.

The capacitors can be manufactured in an especially easy way because the intermittently metal-free insulating strips have to be produced practically only during the winding operation.

Let a respective example for capacitors having a capacitance of 220 nF with a grid dimension of 2.5 mm be specified to illustrate the advantages of the invention.

Plastic films having a width of 2.3 mm are employed for wound capacitors of the prior art which are contacted at both opposite end faces and are therefore not low-induction. The winding dimensions for a flat winding are as follows: 2.4 mm length in the direction of the winding axis, 5 mm width, and 1.5 mm thickness. These capacitors are built into appropriate cups.

For cups having the same dimensions as for the known capacitors, low-induction wound capacitors of the present invention with plastic films having a width of 10.5 mm for a double winding can be wound, whereby the following winding dimensions are achieved: 10.2 mm length in the direction of the winding axis, 3.6 mm width, and 1.5 mm thickness. The significantly larger dimensions of the winding, especially of a double winding, enable a significantly better manipulation, particularly when applying the contact metal layers by a schoopage method.

The regenerably thin metal layers on the dielectric bands can be removed, as needed, at the beginning and at the end of the plastic films to be wound. They are removed in a known way by grinding or by severing so that a desired insulation is achieved. However, it is also possible to produce a metal-free insulating strip transversely across the film width with a laser beam, namely at the beginning of the film and at the end of the film.

DESCRIPTION OF THE PREFERRED EMBODIMENTS

Idential or mutually corresponding parts in the drawings are provided with the same reference characters.

Figure 1:
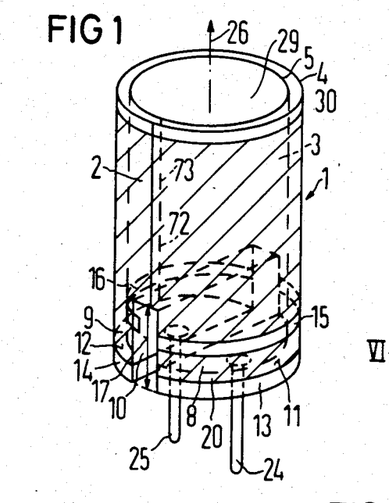
FIG. 1 illustrates in perspective view a wound capacitor having a round cross section.

The electrical capacitor of FIG. 1 is formed of a consolidated, circular winding 1 which, however, can also be an oval or a flat cross section. In this context, consolidated means that an adequate winding tension is already insured during winding by means of a corresponding tension of the winding operation, or that the finished winding or even the wound capacitors are subjected to a brief tempering process.

The coating 2 is applied regenerably thin to the dielectric band 4, whereas the coating 3 is applied regenerably thin to the dielectric band 5 as a cooperating coating. Aluminum, either alone or alloyed with other metals, preferably serves as the metal for the coating.

An incision 10 is present in the direction of the longitudinal axis 26 in the end face lying opposite the upper end face 29. This incision divides the winding 1 into two major projections 8 and 9 in this end face region. The ends 6 and 7 of the major projections 8 and 9 form two surfaces 11 and 12 on which metal layers 13 and 14 are applied, particularly by means of the known metal-spraying method (schoopage process).

As a consequence of the metal-free insulating strips 15 and 16, the coatings 2 and 3 on the dielectric bands 4 and 5, alternating from wound layer to wound layer, are isolated from the metal layers 13 and 14 serving the purpose of contacting.

Figure 2:
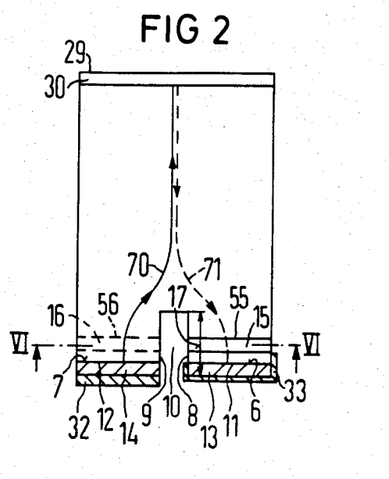
FIG. 2 shows a plan view of the winding of FIG. 1 in the direction of the incision.

It is shown in FIG. 2 that the current paths 70 on the upper coating proceed upwardly in the arrow direction starting from the metal layer 14. The current paths on the next successive coating of the next dielectric layer proceed in the opposite direction, namely downwardly to the metal layer 13. As a consequence of this oppositely directed propagation of the current paths, these mutually compensate, so that a magnetic field producing an induction cannot built up.

Whereas the power lead wires 24 and 25 in FIG. 1 are secured to the metal layers 13 and 14 by, for example, soldering or welding, it is shown in FIG. 2 that simple, solderable metal layers 32 can also be applied for the integration of such a capacitor, namely applied to both major projections 8 and 9. These solderable metal layers at the two projections 8 and 9 can also be fashioned cap-shaped, these then embracing the projection in cap-like fashion. In this way, the capacitor can be secured to the contact locations of a printed circuit without employing lead wires (chip format).

Figure 3:
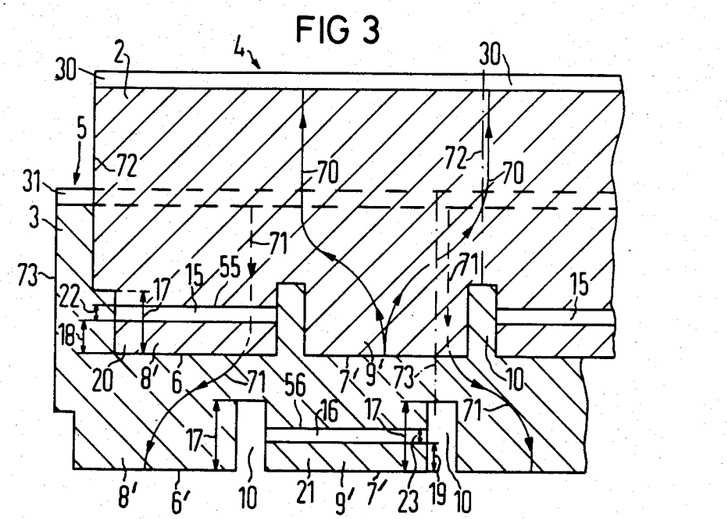
FIG. 3 illustrates the upper layers of the winding of FIG. 1 in their unrolled condition.

FIG. 3 shows two unrolled layers of the capacitor of FIG. 1 which would arise if the metallized dielectric layer 4 were cut along the line 72, the metallized dielectric layer 5 were cut along the line 73, and the capacitor were then unrolled.

In their upper region, the dielectric bands 4 and 5 comprise metal-free insulating strips 30 and 31 whose effect and purpose have already been set forth above. A metal-free strip 15, by means of which a remaining metal strip 20 has arisen, is shown at that part of the dielectric band 4 associated with projection 8 and shown at the left side of the drawing. In the present case, the depth 17 of the incision 10 is greater than the sum of the widths 18 and 22 of the remaining metal strip 20 and of the metal-free insulating strip 15. In any case, the depth 17 must at least be greater than the width 18 of the remaining metal strip 20, for only then is the coating 2 electrically isolated from an end 6' of an individual projection 8'.

On the projection 8', the coating 2 of the dielectric band 4 extends up to the upper edge 55 of the metal-free insulating strip 15. It thus extends up to an end 7' on an individual projection 9'.

In comparison thereto, the coating 3 of the dielectric band 5 extends on the projection 8' up to the end 6' and, on the projection 9', only extends up to the upper edge 56 of the metal-free insulating strip 16. The remaining metal strip 21 is located between the end 7' and this metal-free insulating strip 16. The depth 17 of the incision 10 herein is likewise greater than the sum of the widths 19 and 23 of the remaining metal strip 21 and of the metal-free insulating strip 16.

FIG. 3 also shows the path of the current paths 70 on the coating 2 of the dielectric band 4 and of the current paths 71 on the coating 3 of the dielectric band 5. From this, it becomes clear that the capacitor can function in a nearly induction-free manner.

The manufacturing method shall be set forth in greater detail with reference to FIG. 4.

An upper band 34 and a lower band 35 which are respectively metallized up to the edges 38 and 39, and here comprise metal-free insulating strips 30 and 31 at the opposite edges 36 and 37, are wound onto the winding spindle 45 in the winding direction 46. It is indicated for the winding spindle 45 that it is divided in the longitudinal direction and is formed of an upper part and of a lower part. These two parts are respectively fashioned in tapered fashion from the one end face to the end face lying opposite thereto. Such divided winding spindles are known and serve the purpose of an easier removal of the winding spindle from the winding.

The cam 44 on the winding spindle 45 is meant to indicate that the apparatus referenced 74 and 75 for the manufacture of the insulating strips 42 on the band 34 (produced as above) and of the insulating strips 43 on the band 35 (produced as below) are controlled dependent on the rotational speed of the winding spindle 45. The intermittent insulating strips 42 and 43 are produced at distances 40 and 41 from the edges 38 and 39.

The production of the insulating strips 42 and 43 with an offset of 180° at the beginnings 49 and 50 of the insulating strips is begun at the same time as, and is in turn concluded, at the ends 47 and 48 after half a revolution of the winding spindle 45. A 180° revolution of the winding spindle then follows, during which no metal-free insulating strips are produced. As a consequence thereof, the centers 64 and 65 of the insulating strips 42 and 43, offset by 180°, proceed into diametrically opposite positions in the finished winding.

This winding operation is continued until the required number of windings for the desired capacitance has been reached.

The demetallization means can already be switched to a continuous mode for the first windings as well as for the last windings. At the end of the productions of the blank windings and at the beginning of the winding for the cover layers, the above-described, transversely proceeding metal-free insulating strips are generated, for example by a corresponding control of the laser, by abrasion, or by electrical ablation. Thus, the windings whose metallizations are no longer electrically connected to one another in the finished wound capacitor arise.

After the removal of the winding spindle 45 from the winding 1, the incision 10 is produced in the end faces 53 after the application of a metal layer 54, which serves the purpose of contracting. This incision 10 can be produced such that it proceeds in the center between the oppositely situated centers 64 and 65 of the metal-free insulating strips 42 and 43, and thus produces the two symmetrical major projections 8 and 9.

As a result of the revolution-controlled operation of the de-metallization means, the lengths 51 and 52 of the metal-free insulating strips 42 and 43 increase with increasing radius of the winding.

Figure 5:
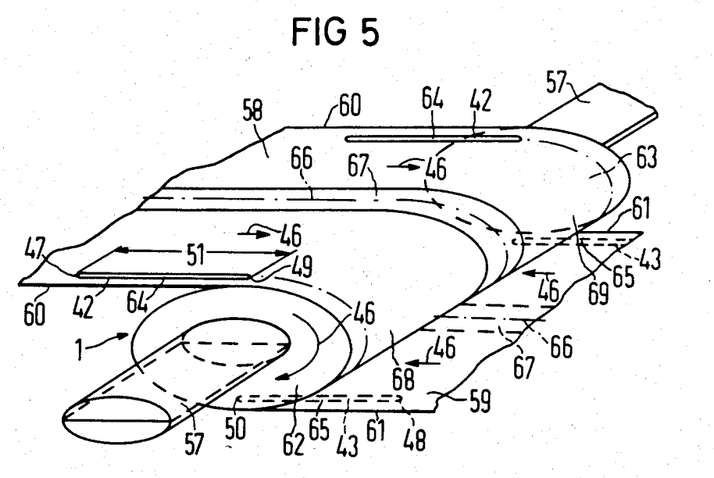
FIG. 5 illustrates the winding operation for the manufacture of two windings having an oval cross section.

FIG. 5 shows an especially advantageous embodiment of this method. Here, a winding spindle 57 having an oval cross section is present instead of a circular winding spindle. Metallized bands 58 and 59 which preferably comprise metal-free insulating strips 67 in the middle are wound onto this winding spindle 57 in the same fashion as set forth above. The winding direction here is likewise referenced 46.

In the method of FIG. 5, the bands 58 and 59 are respectively provided with the intermittently metal-free insulating strips 42 and 43 at both edges 60 and 61. Thus, the production of the metal-free insulating strips 42 and 43 is begun at 49 and 50, and ended at 47 and 48, dependent on the revolution of the winding spindle 57. The winding direction 46 is the same as shown in FIG. 4.

Figure 6:
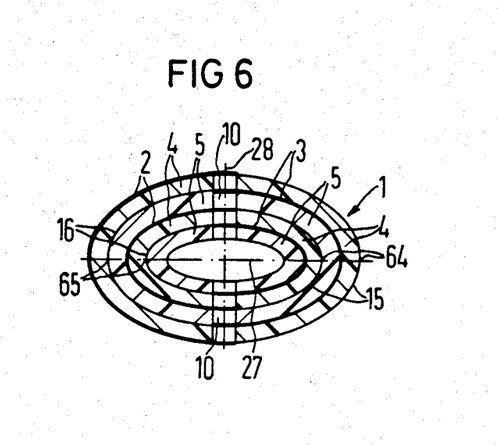
FIG. 6 shows a section along the line VI—VI in FIG. 2, but for a winding having an oval cross section.

After the removal of the winding spindle 57, shown as a bipartite winding spindle, from the winding 1 the incision 10 is produced in the end faces 62 and 63 along the short semiaxis, as illustrated in FIG. 6.

Figure 4:
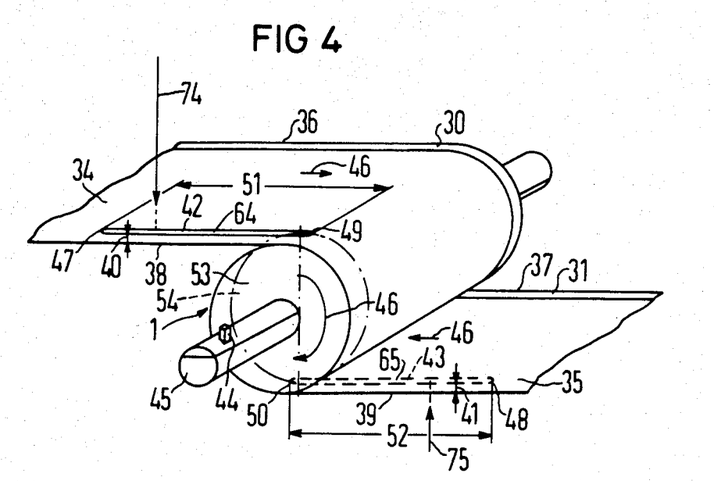
FIG. 4 shows the winding operation for the manufacture of a round winding.

The metal-free strips 42 in FIGS. 4 and 5 correspond to the metal-free strips 15 in FIGS. 1, 2, and 3. The metal-free strips 43 in FIGS. 4 and 5 correspond to the metal-free strips 16 in FIGS. 1, 2, and 3. The centers 64 or 65 of the metal-free strips 42 and 43 in the finished winding are also the centers of the metal-free strips 15 and 16.

Taking this explanation into consideration, it becomes clear from FIG. 6 how the section VI—VI through FIG. 2 is to be understood. For the purpose of simplifying the illustration in FIG. 6, the helical path of the individual windings which, of course, is present in practice, has not been shown.

The coatings 2 are applied to the dielectric bands 4 and the coatings 3 are applied to the dielectric bands 5, these coatings having been identified as thicker lines. By contrast, the metal-free insulating strips 15 and 16 on the bands 4 (shown at the right in FIG. 6) and the metal-free insulating strips 16 on the dielectric bands 5 (shown at the left in FIG. 6) are identified as thinner lines. The centers 64 or 65 of the metal-free insulating strips 15 and 16 lie on the long semiaxis 27 of the winding 1 having an oval cross section. The incision 10 proceeds in the direction of the short semiaxis 28.

Figure 7:
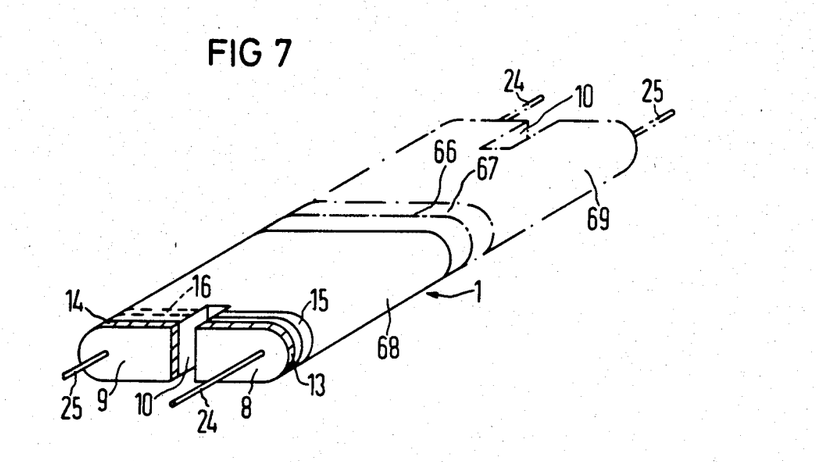
FIG. 7 illustrates a capacitor having a flat cross section, whereby a double winding is indicated.

FIG. 7 shows a wound capacitor formed of a winding 1 having a flat cross section. This capacitor is either manufactured on a flat winding spindle (whereby the winding spindle can remain in the winding under given conditions) or the winding 1 can also be manufactured such that the dielectric bands are first wound onto a winding spindle having a circular or an oval cross section. The winding is thus pressed flat after the removal of the winding spindle. All of these techniques are known prior art.

In the present case, however, the power lead wires are not fastened to opposite end faces of this winding. Rather, the structure corresponds to the structure of FIG. 1 which is also set forth in conjunction with FIGS. 2 and 3.

Such a wound capacitor comprising a flat cross section of the winding can also be initially produced as a double winding, that is divided into two individual windings 68 and 69 along the line 66 in the center of the existing metal-free insulating strip 67, under given conditions. Thus, the two capacitors can be manufactured therefrom. For producing the incision 10, a plurality of flat double windings can be stacked on top of one another and can be provided with the incision 10 after the endface metallization. This manufacturing operation is particularly suitable.

De-metallizations with laser beams 74 and 75 prove most beneficial for producing the insulating strips 15, 16, 42, 43 in the metal coatings 2, 3. For this purpose, the receptacle means for the winding spindle is mechanically coupled to an angle generator (decoder). The decoder emits electrical pulses to a control electronics in synchronization with the angular revolution. The control electronics controls the laser pulses such that with a prescribed program, the insulating strips arise in the metal coatings of the bands, as shown in FIGS. 3, 4, and 5.

In the manufacture of the winding, the insulating strips 42, 43 should be produced before the bands 34, 35, 58, 59 run onto the winding 1 in order to prevent damage to the metal coatings 2, 3 under the respectively uppermost layer that is already de-metallized. In FIG. 4, the laser beams (indicated by arrows 74 and 75) are shown at a lateral distance from the winding spindle 45. Due to the necessity of accomplishing the production of the insulating strips before running onto the winding, the control electronics must be programmed such that the insulating strips 42, 43 come to lie correctly above one another in the full winding. A control via the number of turns with a prescribed mean film thickness thus generally suffices.

The manufacture of the winding and the further processing thereof (flattening given windings having a flat cross section, application of the metal layer by means of the schoopage process, application of the power lead elements) can be rationalized in comparison to standard winding methods when, as indicated in FIGS. 5 and 7, a double winding of correspondingly wide films is wound. The double winding is divided into two sub-windings 68, 69 by means of an isolating saw cut. Thus, the stretched plastic film is partially de-stretched and the metal coating composed of valve metal, especially aluminum, is made insulating in a narrow region. It is applied along the line 66, given continuously metallized films. These sub-windings are identical in mirror-inverted fashion. Four laser beams are needed for the production of double windings. These four laser beams provide each band 58, 59 with the insulating strips 42 and 43 in the region of the edges of each band 58, 59.

After the removal of the spindle, these windings must be compressed in a defined radial position, namely in the direction of the short axis 28, due to the position of the insulating strips that results during manufacture. It is thus favorable to either wind on oval-shaped winding spindles in a known fashion, or to combine the flattening with the removal from the spindle in a defined spindle position.

Figure 8:
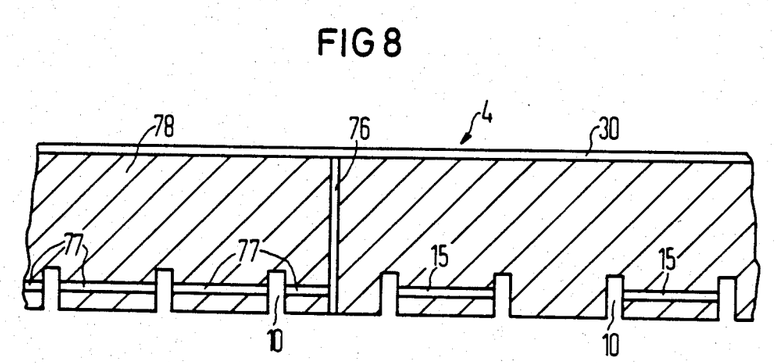
FIG. 8 illustrates a winding similar to FIG. 3 wherein a portion of at least one or both of the bands is provided with an isolated metallization to form a blank winding or cover layer winding.

FIG. 8 illustrates the concept of providing the above described initial blank winding. Reference numeral 76 shows the transverse metal-free insulating strip and reference numeral 77 shows the continuous metal-free insulating strip occurring in the position of the band shown at 78 which can function as an initial blank winding or a cover layer winding. In FIG. 8, the portion of the band forming the initial blank winding of windings is at the beginning of a band. Of course, for cover windings, the portion of the band forming the cover winding is at the end of a band (this is not specifically shown in FIG. 8).

Although various minor changes and modifications might be proposed by those skilled in the art, it will be understood that I wish to include within the claims of the patent warranted hereon all such changes and modifications as reasonably come within my contribution to the art.

I claim as my invention:

1. An electrical capacitor, comprising:
   a plurality of dielectric bands of stretched plastic film wound together with one another to form a consolidated winding having first and second opposite end faces;
   the bands having a regenerably thin metal layer thereon as a coating;
   at the first end face of the capacitor an incision being provided in the wound bands, said incision proceeding in a direction of and approximately along a central longitudinal axis of the winding, said incision forming a plurality of individual projections along a first side edge of each band;
   metal-free insulating strips being extending longitudinally in a winding direction of and at alternate projections in each band and such that the metal-free insulating strips alternate in aligned projections of adjacent bands;
   a depth of the incision being at least sufficient to intersect the metal-free insulating strip and thus electrically isolate an end of those projections having the metal-free insulating strip;
   the individual projections of the bands combining to form two major projections at said first end face as a result of the incision; and
   ends of the two major projections of the consolidated winding being provided with respective metal contacting layers, a contact surface thus being formed at ends of each major projection.

2. An electrical capacitor according to claim 1 wherein the depth of the incision is greater than a width of a remaining metal strip between the insulating strip and the first side edge of the band.

3. An electrical capacitor according to claim 1 wherein the depth of the incision corresponds with an inside edge of the insulating strips on the individual band projections.

4. An electrical capacitor according to claim 1 wherein the depth of the incision extends beyond inside edges of insulating strips on the individual band projections.

5. An electrical capacitor according to claim 1 wherein the dielectric bands of stretched plastic film are 1 to 15 $\mu$m thick.

6. An electrical capacitor according to claim 1 wherei the dielectric bands have metal-free strips along second side edges opposite the first side edges and thus at the second end face of the capacitor.

7. An electrical capacitor according to claim 1 wherein power lead wires extending substantially in a direction of said longitudinal axis of the winding are secured to the metal layers on the major projections.

8. An electrical capacitor according to claim 1 wherein for integration of the capacitor in chip format, power leads of solderable metal are secured to the metal layers of the major projections, said power leads being cap-shaped and embracing feet formed by the major projections.

9. An electrical capacitor according to claim 1 wherein the depth of the incision is chosen to obtain a desired capacitance.

10. An electrical capacitor according to claim 1 wherein a width of the incision is chosen so as to obtain a desired capacitance.

11. An electrical capacitor according to claim 1 wherein at least one of the dielectric bands has a portion which forms at least one winding which is provided with a metal-free transversely proceeding insulating strip running perpendicular to the winding direction so that a metallization on said portion of said at least one band comprising the winding does not electrically connect to the contact metal layers at the projections not to metallization at portions of said at least one band having said alternating insulation strips.

12. An electrical capacitor, comprising:
   a plurality of dielectric bands wound together with one another to form a consolidated winding;
   the bands having a regenerably thin metal layer thereon as a coating;
   at one end face of the capacitor an incision being provided approximately along a central longitudinal axis of the winding so as to create first and second major projections at the one end face of the capacitor;
   in each major projection on a portion of the bands extending into said projection, a metal-free insulating strip being provided on alternate band portions such that a metal contact layer at an end face of each major projection contacts alternate band extensions in each respective major projection and is insulated from contacting the metal layer on alternate bands; and
   surfaces of end faces of the two major projections being coated with respective metal contacting layers.

13. A method for manufacture of an electrical capacitor, comprising:
   providing first and second bands of plastic film each of which is metallized on one side;
   providing the first and second metallized bands along one edge with a metal-free insulating strip, and near the opposite edge but spaced therefrom, providing metal-free insulating strips of predetermined length extending longitudinally and periodically along a winding direction of the bands, a spacing of the metal-free insulating strips from said opposite edge being chosen such that after the windings have been wound onto a spindle, and when an incision is provided at one end face of the winding adjacent the band opposite edges, the incision will intersect both ends of each metal-free insulating strip;
   winding the first and second metallized bands onto a winding spindle and aligning the first and second metallized bands during the winding and positioning the metal-free strips on the bands such that centers of the insulating strips of the first band are opposite centers of the insulating strips of the second band at the other side of the winding;
   after finishing the winding, applying a metal layer to said one end face of the winding near the periodic insulating strips and providing an incision in said one end face which runs laterally perpendicular to a connecting line between the centers of the insulating strips of the first and second windings, said incision proceeding inwardly into the winding in a direction of and substantially along a longitudinal axis of the winding so as to create first and second major projections defined by a width and depth of the incisions; and
   finishing the capacitor by applying power leads to the metal layer on each of the major projections, and applying a voltage for curing voids in an inside of the winding at edges thereof.

14. A method according to claim 13 including the step of providing a metal-free insulating strip along an opposite edge of the first and second bands.

15. A method according to claim 13 including the steps of providing the first and second bands to be wound on the spindle with the intermittent metal-free insulating strips at both opposite edges so that after winding of the bands, two capacitors can be produced by cutting along a substantial center line after a conclusion of the winding operation.

16. A method according to claim 15 including the steps of providing a central metal-free insulating strip along a winding direction centrally of the two bands at which the two capacitors are to be cut apart.

17. A method according to claim 13 including the steps of applying a laser beam synchronously controlled with a rotation of the winding spindle during the winding operation in order to create the insulating strips and achieve a desired position and length of the periodic insulating strips relative to one another as well as relative to the arrangement in the winding as a radius thereof increases during the winding operation.

18. A method according to claim 13 wherein an aberation wheel is applied which is controlled synchronized with a rotation of the winding spindle during the winding in order to create the insulating strips during the winding and to achieve a desired position and length of the periodic insulating strips relative to one another as well as relative to their arrangement in the winding as radius increases during the winding operation.

19. A method according to claim 13 including the steps of providing at least one blank winding formed by a portion of at least one of the first and second metallized bands, said blank winding having a metal-free insulating strip running in a winding direction of the metallized band and near said opposite edge at which the band has the metal-free insulating strips of predetermined length, providing at least one separating metal-free insulating strip running transversely across the band perpendicular to the winding direction at an end of said portion of the at least one band forming the at least one blank winding, and said blank winding being wound onto the spindle as a part of said at least one band, metallization on the portion of the at least one band forming the blank winding not being electrically connected to metallization at remaining portions of the band not to said metal layer on said major projections in the finished capacitor.

20. A method according to claim 13, including the steps of providing at least one cover layer winding formed by a portion of at least one of the first and second metallized bands, said cover winding having a metal-free insulating strip running in a winding direction of the metallized band and near said opposite edge at which the band has the metal-free insulating strips of predetermined length, providing at least one separating metal-free insulating strip running transversely across the band perpendicular to the winding direction at an end of said portion of the at least one band forming the at least one cover winding, and said cover winding being wound onto the capacitor as part of said at least one band, metallization on the portion of the at least one band forming the cover winding not being electrically connected to metallization at remaining portions of the band nor to said metal layer on said major projections in the finished capacitor.

21. A method for manufacture of an electrical capacitor, comprising:

providing first and second bands of dielectric film which is metallized on one side;

providing the first and second metallized bands near one edge but spaced therefrom;

providing metal-free insulating strips of predetermined length extending longitudinally and periodically along a winding direction of the bands, a spacing of the metal-free insulating strips from said one edge being chosen such that after the windings have been wound onto spindle, and when an incision is provided at one end face of the winding adjacent said one edge of the bands, the incision will intersect both ends of each metal-free insulating strip;

winding the first and second metallized bands onto a winding spindle and aligning the first and second metallized bands during the winding and positioning the metal-free strips on the bands such that centers of the insulating strips of the first band are opposite centers of the insulating strips of the second band at the other side of the winding; and after finishing the winding, applying a contacting metal layer to said one end face of the winding near the periodic insulating strips and providing an incision in said one end face which runs laterally perpendicular to a connecting line between the centers of the insulating strip of the first and second windings, said incision proceeding inwardly into the winding in a direction of and substantially along a longitudinal axis of the winding so as to create first and second major projections defined by a width and depth of the incisions.

* * * * *